Nov. 27, 1934.   D. SULPRIZIO   1,982,330

PISTON

Filed Feb. 12, 1932

INVENTOR.
DEUTA SULPRIZIO
BY Miller Boyken & Bried
ATTORNEYS.

Patented Nov. 27, 1934

1,982,330

UNITED STATES PATENT OFFICE 1,982,330

PISTON

Deuta Sulprizio, San Leandro, Calif.

Application February 12, 1932, Serial No. 592,596

6 Claims. (Cl. 309—11)

This invention relates to split skirt pistons and has for its objects improved construction of such pistons whereby a better distribution of heat and of the working stresses set up is obtained, a more perfect fit is maintained in the cylinder under temperature and wear changes, and effective lubrication without oil pumping is assured. Other objects and advantages of the invention will appear in the following description and accompanying drawing.

Figure 1:
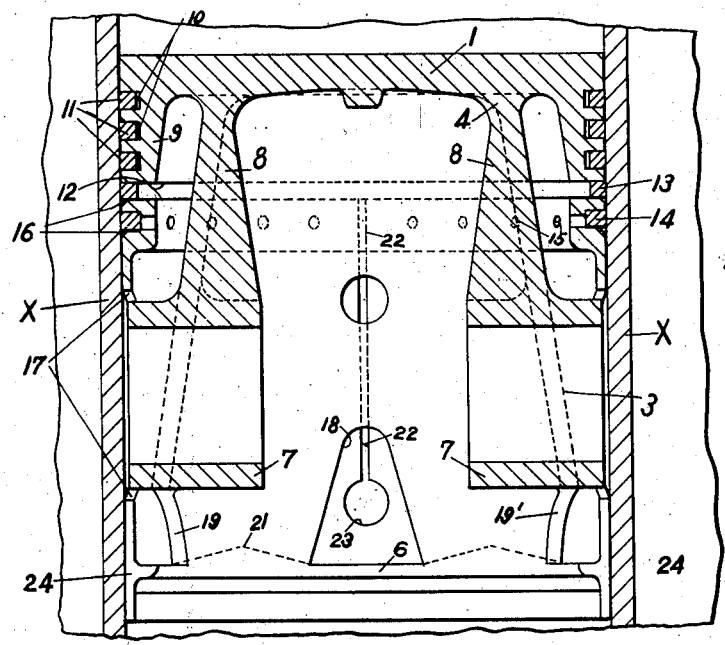

In the drawing Fig. 1 is a vertical section of my improved piston positioned within the walls of a cylinder but with the wrist pin and connecting rod omitted, the section being taken through the hubs of the wrist pin bosses.

Figure 2:
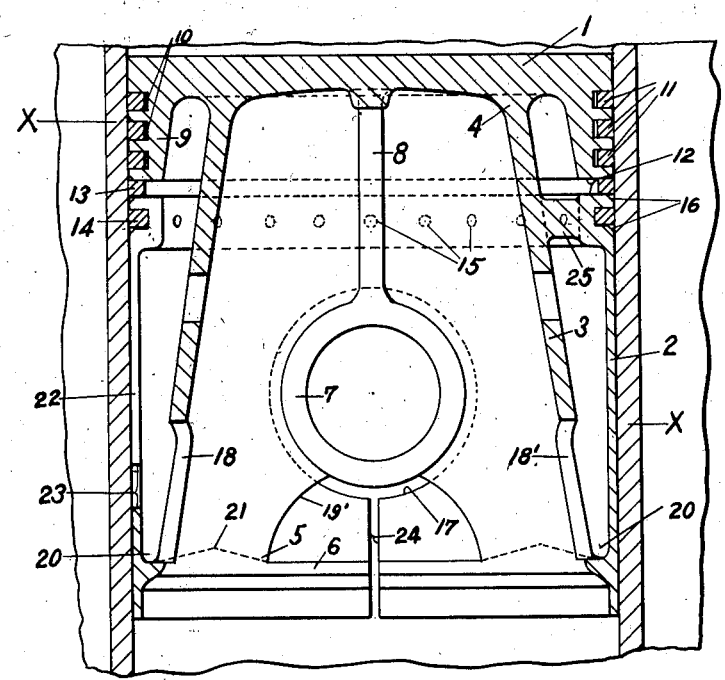

Fig. 2 is a similar view to that of Fig. 1 but is taken on a line at right angles to the section of Fig. 1.

In further detail, the cylinder is indicated at X, and the piston comprises a head portion 1, a skirt portion 2, and an internal boss-carrying portion 3 connected at its upper end at 4 to the head portion and at its lower end at 5 to the skirt portion, or rather to an internal circumferentially extending rib 6. This internal portion 3 is conical in form and supports the pin bosses 7 which are cast integrally to it, and further braced by a short triangular-shaped vertical rib 8 extending just to the under side of the piston head.

The head 1 is a thick disk formed with a downwardly extending peripheral flange 9, the outer surface of which is circumferentially grooved at 10 for the piston rings 11 and it is entirely separated from the skirt or sleeve portion 2 by an annular slot 12 which extends clear around the piston and within which slot is a piston ring 13.

The upper end of the skirt or sleeve portion of the piston is made about three times as thick as the skirt and formed with a piston ring groove in which is bottomed a ring 14, while small holes 15 drilled through this groove to the space between the skirt and the hub supporting member 3 are provided so as to discharge excess oil to said space.

Rings 13 and 14 are slightly narrower in thickness than the width of the slot and groove respectively in which they operate so that excess oil scraped up on the downward stroke by their lower corners can readily escape below the ring to the hollow space within the piston, and to facilitate this oil scraping action the corners of the slot and groove are chamfered off as at 16 at the under sides of the rings. All the rings are supposed to be common split piston rings free to expand, but 14 is the only one which is bottomed and for a reason which will be later explained. This ring 14, as stated, gathers and drags the oil under it and discharges it through the holes 15.

Hubs 7 are entirely free from skirt 2 and holes 17 are formed in the latter larger than the hubs so as to give free expansive and contractile movement to the skirt, and also drainages of oil from force feed on the pin bearings into the inside of the piston.

The lower margin of conical member 3 is cut away at four points as at 18, 18', 19, 19', so as to provide four legs or points of juncture of member 3 with the flange rib 6 of the skirt, the four legs thus formed are spaced inwardly from the skirt so as to leave an annular channel 20 between the legs and the skirt and the bottom of this is sloped to a high point 21 behind each leg so that all oil will run out.

The side wall of the skirt opposite the pressure side (caused by angle of crank upon the power stroke) is vertically slotted as at 22 through the upper end down to a point near the bottom of the hubs and terminating in a hole 23; and on the two sides at right angles to this slot the lower end of the skirt is vertically slotted as at 24 to join the hub clearance opening 17, thus forming very resilient piston skirt walls without the objection of slotting the skirt clear through. The great length of conical member 3 and its attachment at the extreme lower end to the lower end of the skirt, overcomes the objectionable rigidity in earlier constructions of this type.

At a point on the pressure side of the piston substantially opposite hole 23 is a small post or spud 25 integrally connecting the upper thickened margin of the skirt with the conical hub carrier 3 for the purpose of sustaining the structure at this point of great pressure when the piston is used in an explosive engine.

It should be noted that the upper end of the conical hub carrier joins the piston head 1 at a point spaced well inwardly from the piston flange 9 and this results in the included head area within the conical wall 3 being substantially equal to the head area between wall 3 and flange 9 with a result that the head is evenly supported against the shock of exploding gases in two circular areas.

The conical form of the hub carrier 3 and close juncture with the skirt at its lower edge in four spaced places makes for unusual flexibility at this point where heretofore a resistance to compression or flexibility was set up. The conical shape of the hub carrier extending downward from an intermediate point on the piston head also transmits the explosive blow evenly therefrom to the hubs and pin.

The piston is designed especially for aluminum alloy castings carried out with sand cores, and any required holes for supporting the core of the intershell space may be left through the wall of member 3 above the hubs. In making these pistons the upper portion 9 is made slightly smaller in diameter than the skirt so that the split rings 10 will effect the seal in the usual way. Ring 13 also being a split ring contributes considerably to the sealing action while also functioning as a special oil scraper as well as a barrier against uninterrupted transmission of heat from the head to the skirt as there are always changing oil films to cross.

In pistons of this kind it is the practice to have the head portion which carries rings 10 of a trifle smaller diameter than the bore of the cylinder and let the rings effect the seal. The skirt portion, however, is for the purpose of guiding the piston and should fit smoothly within the bore, but on account of the great expansive effect of aluminum alloys when heated, the diameter of the skirt is made a trifle small so that when fully heated it will not be too tight. This usually means that the skirt is just a trifle free in the cylinder when cold, and hence is liable to rattle until heated. My provision of split ring 14 in the upper end of the skirt overcomes this entirely, for it is of iron or steel and of an external diameter to just fit nicely within the cylinder when bottomed in its groove, so that when starting cold the skirt will not rattle and when heated up the aluminum alloy skirt portion being of greater co-efficient of expansion will enlarge to just equal the ring diameter so that the whole skirt will take the wear. Thus the cold piston skirt first finds bearing through ring 14 and as soon as hot also finds bearing throughout its length, and this effectually prevents rattling or slapping. Besides this, the ring will scrape off and guide most of the oil back into the hollow piston, so that any surplus passing this ring will be picked up by ring 12 for guiding through slot 12 by ring 13.

Having thus described my improved piston, what I claim is:—

1. A piston comprising an inverted cup-shaped head, a skirt separated from said head, an inside structure connecting the under-side of said head circumferentially with the margin at the lower end of said skirt, wrist pin bearing bosses on said inside structure free of said skirt, and means connecting said structure and the upper end of said skirt in a limited region intermediate said bosses at one side of the skirt only.

2. A piston comprising an inverted cup-shaped head, a skirt separated from said head, an inside structure connecting the under-side of said head circumferentially with the margin at the lower end of said skirt, wrist pin bearing bosses on said inside structure free of said skirt, and means integrally connecting said structure and the upper end of said skirt in a limited region intermediate said bosses at one side of the skirt only.

3. A piston comprising a head, a skirt separated from said head, an inside structure connecting said head with the lower end of said skirt, wrist pin bearing bosses on said inside structure free of said skirt, and means connecting said structure and the upper end of said skirt in a region intermediate said bosses, said skirt being split in the region between the wrist pin bearing bosses opposite said means.

4. A piston comprising a head, a skirt separated from said head, an inside structure connecting said head with the lower end of said skirt, wrist pin bearing bosses on said inside structure free of said skirt, and means connecting said structure and the upper end of said skirt in a region intermediate said bosses, said skirt being split in the region between the wrist pin bearing bosses opposite said means to the upper end of said skirt.

5. In a piston provided with a head and a skirt separated from the head, an internal structure depending from the head supporting wrist pin bosses free from the skirt and suspending the skirt by connections thereto around its lower end below the bosses and forming a channel between the skirt and the internal structure, the upper surface of said channel formed with a slant to discharge oil from between the skirt and internal structure.

6. An aluminum alloy hollow piston comprising a head portion, and a split skirt portion separated from the head portion by a circumferential slot, means within the hollow piston integrally connecting the lower margin of the skirt portion with the under side of the head portion, split piston rings in the head portion, and an iron split piston ring carried wholly by and bottomed throughout its circumference in a groove in the upper portion of the split skirt portion, said iron ring being of an external diameter to bear against the cylinder walls when the skirt is cold for guiding the skirt, and the diameter of the skirt when cold being of slightly less diameter than the diameter of said ring, and substantially equal thereto when hot.

DEUTA SULPRIZIO.